March 30, 1954   J. D. CASSIDY ET AL   2,673,500
FILM CASSETTE
Filed Nov. 9, 1950

INVENTORS
John D. Cassidy
Joseph David Mack
BY
their ATTORNEY

Patented Mar. 30, 1954

2,673,500

UNITED STATES PATENT OFFICE 2,673,500

FILM CASSETTE

John D. Cassidy, Riverside, Conn., and Joseph David Marks, West Orange, N. J., assignors to Universal Camera Corporation, New York, N. Y., a corporation of Delaware Application November 9, 1950, Serial No. 194,865

3 Claims. (Cl. 95—34)

This invention relates to film holding cassettes or magazines for cameras and, more particularly, to an improved and simplified cassette including a novel arrangement for reeling the exposed film as it is fed past the exposure aperture of the cassette.

Cassettes of the type to which the present invention is directed are arranged to hold a roll of multi-frame film which is drawn, by the camera mechanism, past an exposure aperture in the cassette and the exposed film is rolled up within the cassette. The cassettes are so designed that they may be bodily engaged and disengaged relative to the camera, locating means being provided to align the cassette exposure aperture with the optical system of the camera.

As presently provided, such cassettes or magazines, and the cameras cooperable therewith, are associated or provided with relatively complicated mechanisms for drawing the film past the cassette aperture and reeling the exposed film. The cassettes are, accordingly, complicated and expensive in construction and require some skill for proper mounting in the camera.

In contradistinction, the present invention is directed to a simple and inexpensive cassette which can be readily and easily engaged and disengaged with its associated camera without any need for skillful or expert handling. The cassette includes simplified relatively stationary means for reeling the exposed film, and includes two easily disengaged parts whereby film may readily be placed in the cassette and removed therefrom.

More specifically, the cassette includes a body member having a pair of longitudinally spaced cylindrical cavities separated by a partition having a slot for guiding the film past an exposure opening. One cavity is arranged to receive a roll of unexposed film and is formed with a curved guide for directing the leading end of the film toward the slot.

A spring plate is arranged to support and guide the film past the aperture, being held in place by suitable locating projections and recesses in the cassette body.

The other cavity contains a relatively wide spiral spring secured at one end to an edge of the aperture, the inner end of the spring being free. This spiral spring receives the leading edge of the film as it leaves the aperture guide plate and guides the exposed film to reel up on itself. For this purpose, the spiral spring is so designed that the radius of its inner end is less than that of the receiving cavity. As the film reels up within the spring, the latter is expanded to approach the cavity wall. The fully wound exposed film can be bodily removed from within the spiral spring.

A matching cover is provided for the body, and the body and cover have suitable cooperating ledge formations. To secure the cover filmly to the body, a groove pin is force-fitted in cooperating aligned recesses of lesser diameter formed, respectively, in the body and cover. To remove the exposed film from the cassette for processing, the body and cover are separated by pressure, displacing the groove pin from the recess aforesaid.

The side of the cover closing the exposure aperture has a guide recess alignable with the sprocket holes in the film. This recess cooperatively receives means on the camera engageable with the sprocket holes to advance the film relative to the aperture. The aperture plate spring has a longitudinal groove aligned with this recess.

For a complete understanding of the invention principles, reference is made to the following description of a typical embodiment thereof as illustrated in the accompanying drawing. In the drawing.

Figure 1:
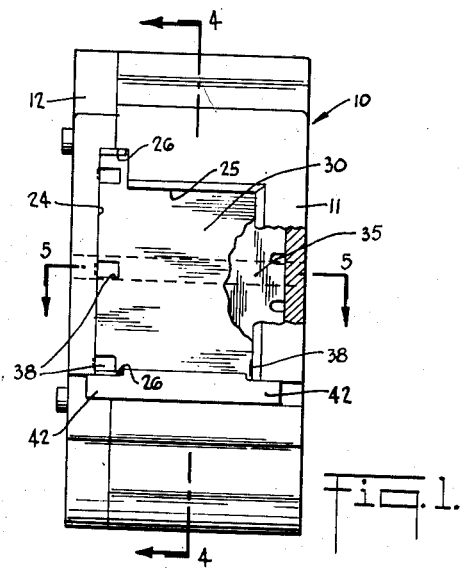
Fig. 1 is a front elevation view, partly in section, of a cassette embodying the invention.
Figure 2:
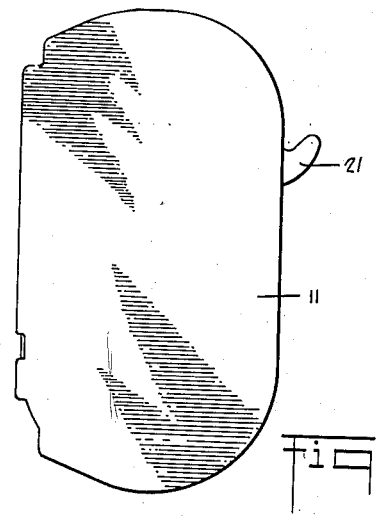
Fig. 2 is a side elevation view of the cassette.
Figure 3:
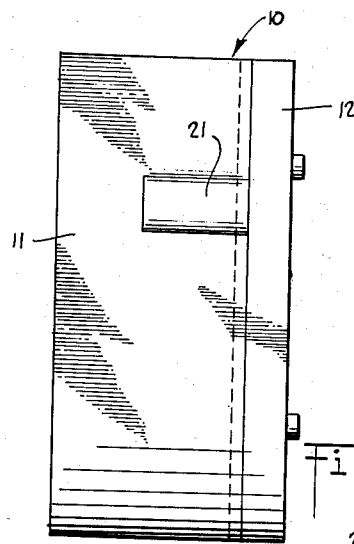
Fig. 3 is a rear elevation view of the cassette.

Referring to the drawing, the cassette 10 includes a body 11 and a mating cover 12. Body 11 is molded or otherwise integrally formed from a suitable plastic composition material which is pigmented or otherwise treated so as to be opaque or light-proof. The body is formed with a longitudinally spaced pair of parallel cylindrical recesses 15 and 20, the ends of the body being substantially semi-cylindrical and united by parallel front and rear walls 17, 18. Rear wall 18 has a hook shaped rib 21 by means of which the cassette 10 may be located and secured within a camera of the type shown, described and claimed in the copending application, filed concurrently herewith, in the names of John D. Cassidy, Joseph David Marks and Wallace W. Ward for "Camera."

The cavities 15 and 20, which will be referred to for convenience as the storage and receiving cavities, respectively, are separated by a central wall or partition 22. The front wall 17, intermediate its ends, has a recess 23 whose edges form three sides of a substantially rectangular exposure aperture 25, the fourth wall of aperture 25 being formed by the cover 12. The edge of cover 12 is recessed, as at 24, to form with notches 26, 26, an elongated slot along one side of aperture 25.

Figure 5:
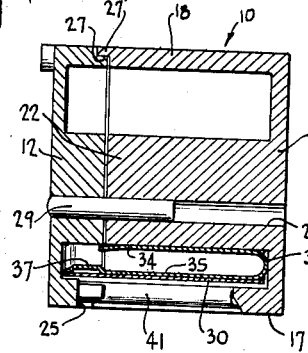
Fig. 5 is a transverse sectional view on the line 5—5 of Fig. 1.

Body 11 and cover 12 have cooperating ledge formations 27, 27' (see Fig. 5) and aligned recesses 28, through which is passed, as by forced fitting, pin 29 of diameter greater than that of the recesses to integrate the cover and body after the film pack has been loaded therein.

Storage cavity 15 receives a wound roll of unexposed, multi-frame film 30, and its bottom wall is formed with an arcuate rib 31 which guides the leading end of film 30 along the cavity wall. Cover 12 has a similarly located mating rib 31'.

Figure 4:
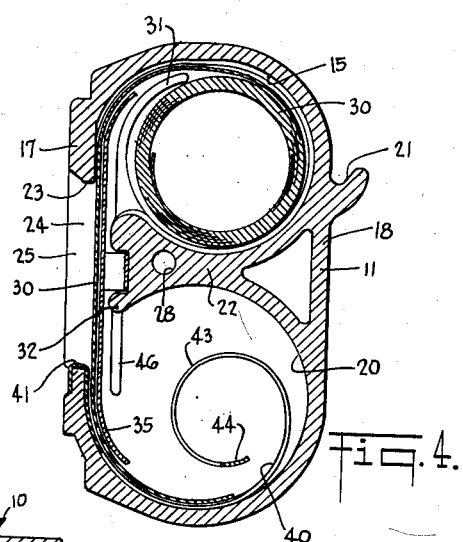
Fig. 4 is a longitudinal sectional view on the line 4—4 of Fig. 1.

The end 32 of partition 22 adjacent aperture 25 is spaced from front wall 17 to provide a slot for film 30 to pass from cavity 15 to receiving cavity 20. This slot receives a flat spring guide plate 35 which underlies aperture 25 and extends therebeyond into both cavities 15 and 20. The ends of plate 35 are suitably curved to guide film 30 from cavity 15 across aperture 25 and into cavity 20, suitable positioning ribs, not shown, being provided on body 11 and cover 12 to hold the guide plate ends slightly spaced from the cavity walls as seen in Fig. 4.

Plate 35 has an integral, transverse hook spring 34 on its inner side which sets in a locating recess 36 in the edge 32 of partition 22. Spring 34 biases plate 35 toward front wall 17. Plate 35 has a longitudinal groove 37 aligned with the slot along the side of aperture 25.

This slot receives suitable mechanisms, on the camera, which extends into the slot and engages the film sprocket holes 38 to advance the film 30 relative to aperture 25.

Figures 6, 7:
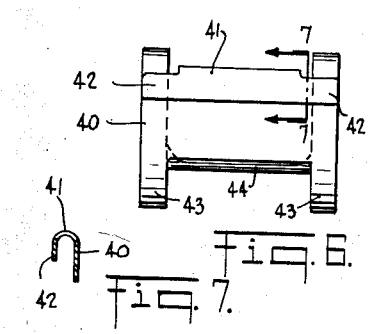
Fig. 6 is an end elevation view of a spiral film guiding spring.
Fig. 7 is a transverse sectional view on the line 7—7 of Fig. 6.

As the leading edge of the film passes the aperture 25, it engages within a spiral spring guide 40 which winds up the exposed film in receiving cavity 20. The outer end of guide 40 has a hooked edge 41 which grips over the trailing edge of aperture 25, having lateral extensions 42, 42 lying in recesses in the edge of cover 12 and in wall 17. The guide 40 lies outwardly of the trailing end of guide plate 35, being spaced therefrom to allow film 30 to enter guide 40. As seen in Fig. 6, guide 40 is substantially in the form of an open rectangle having side bars 43 and an inner end bar 44.

The free inner end of guide 40 is spirally curved to a smaller outer diameter than that of cavity 20. As the film 30 enters the guide, the latter guides the film to curl upon itself within the guide. As more and more film is reeled within guide 40, the film expands the guide outwardly toward the surface of cavity 25, there being, in effect, a progressive partial unwinding of the free inner end of the spring guide.

The film action may be briefly summarized as follows: The wound unexposed film 30 is placed in cavity 15 and its leading edge guided over plate 35 toward aperture 25. The cover 12 is then secured in place and cassette 10 mounted in the camera. The camera mechanism engaging holes 38 moves film 30 past the aperture and its leading edge enters guide 40. When all the exposed film is wound within guide 40, cover 12 is removed and the film roll extracted for processing.

The cassette is simple and inexpensive to construct and assemble. The body 11 and cover 12 are of integral molded construction. Plate 35 and guide 40 are simply slid into place in the body, film 30 put in cavity 15, and cover 12 secured to body 11. The cover and body have mating, guiding and positioning means, such as film guide ribs 31 and 46, which act to properly locate plate 35 and guide 40.

While a specific embodiment of the invention has been shown and described in detail to illustrate the application of the invention principles, it should be understood that the invention may be otherwise embodied without departing from such principles.

What is claimed is:

1. A film holding cassette for insertion in a camera, said cassette comprising a lightproof body member having a pair of longitudinally spaced parallel cylindrical cavities therein, said body member having a forward wall formed with an exposure aperture, and a transverse partition between the cavities and having an end spaced from said forward wall to form a slot for film to pass between the cavities relative to the aperture, a flat guide plate underlying the aperture and extending into each cavity to guide the film between the cavities and past the aperture, the ends of said plate being spaced from the cavity walls to provide for the passage of the film between the plate and such walls, a flat spiral spring guide having an outer end disposed between said guide plate and forward wall and anchored to the trailing edge of the aperture, said guide being within and axially parallel to the film receiving cavity and its inner end being free, said spiral guide winding the film upon itself as the film travels along the guide, and a lightproof cover disengageably secured to said body member.

2. A cassette as claimed in claim 1, in which an integral one piece member defines each of the body and cover, and both are formed with locating means for said guide plate and spiral guide.

3. A cassette as claimed in claim 1, in which said body member and cover are each an integral one piece member of plastic composition material and both are formed with locating means for said guide plate and spiral guide, and the aperture is formed by a recess in the front wall of the body member and an edge of the cover.

JOHN D. CASSIDY.
JOSEPH DAVID MARKS.

References Cited in the file of this patent
UNITED STATES PATENTS

| Number | Name | Date |
| --- | --- | --- |
| 1,823,462 | Morsbach | Sept. 15, 1931 |
| 2,409,605 | Bolsey | Oct. 15, 1946 |
| 2,477,904 | Schwartz | Aug. 2, 1949 |